United States Patent [19]
Hoffman

[11] 3,727,771
[45] Apr. 17, 1973

[54] DRILL DISPENSING CONTAINER

[76] Inventor: John T. Hoffman, 1604 E. Greenleaf Street, Allentown, Pa. 18103

[22] Filed: Aug. 20, 1971

[21] Appl. No.: 173,418

[52] U.S. Cl. ..........................211/69, 221/79, 312/72
[51] Int. Cl..........B25h 3/04, B65d 83/00, A47f 1/00
[58] Field of Search .......................211/69, 70, 60 T; 206/17; 312/72, 73; 221/79, 87

[56] References Cited

UNITED STATES PATENTS

| | | | |
|---|---|---|---|
| 1,997,128 | 4/1935 | Voss | 221/79 |
| 2,351,815 | 6/1944 | Jensen | 206/17 |
| 3,063,551 | 11/1962 | Russell | 206/17 |

FOREIGN PATENTS OR APPLICATIONS

| | | | |
|---|---|---|---|
| 603,021 | 6/1948 | Great Britain | 206/17 |
| 571,945 | 1/1958 | Italy | 206/17 |

*Primary Examiner*—Roy D. Frazier
*Assistant Examiner*—Abraham Frankel
*Attorney*—Fred Fisher

[57] ABSTRACT

A drill dispensing container with base plate having a central shaft receiving hole and holder with depending shaft for rotary motion therewithin. The plate has an axial alignment mark and three spring-loaded ball bearings radially disposed to the mark. The plate has axial cylindrical ball receiving pockets with partially covering lips for limiting bearing travel, and has a concentric recess forming an external rim of sufficient depth that extended bearings do not pass the plane thereof. The holder has through drill-receiving apertures axially disposed therewithin about three concentric circles which are staggered so that no two apertures are aligned along a common holder radius. The holder includes indicia for values of drills carried therewithin, each being radially co-aligned with its corresponding aperture. Indexing means positively coalign the indicia to the mark. Axial shaft motion with respect to the plate is restricted via a circumferential shaft groove restrained by a spring-biased bearing directed thereagainst, the bearing being housed within a radial aperture engaging with the hole. A set screw directs the bearing against the groove, permitting rotation, and restricting axial shaft motion with respect to the plate. The container is indexed via a separate spring loaded bearing disposed on the rim engaging within one of several indentations on the holder surface which faces the plate. The indentations are circularly located having its center at the holder axis, and are at least equal to the total through apertures.

4 Claims, 10 Drawing Figures

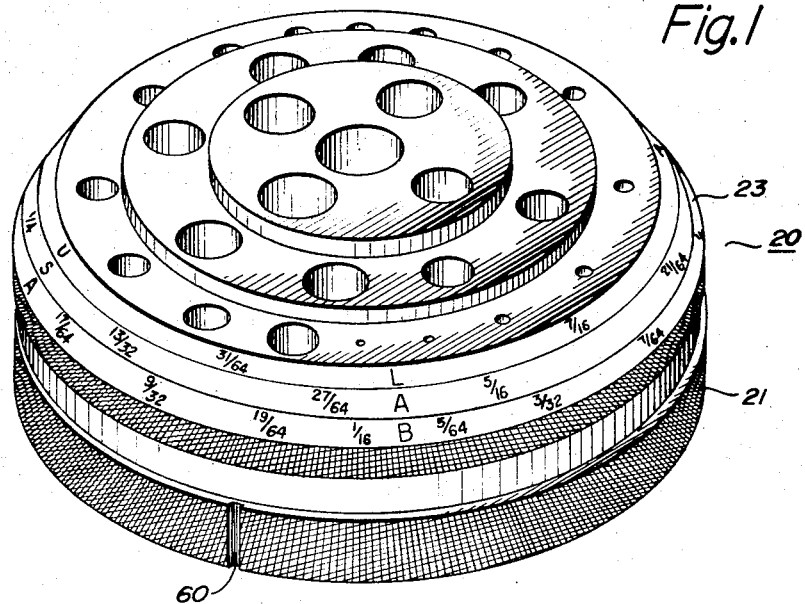

INVENTOR.
John T. Hoffman
BY
ATTORNEY

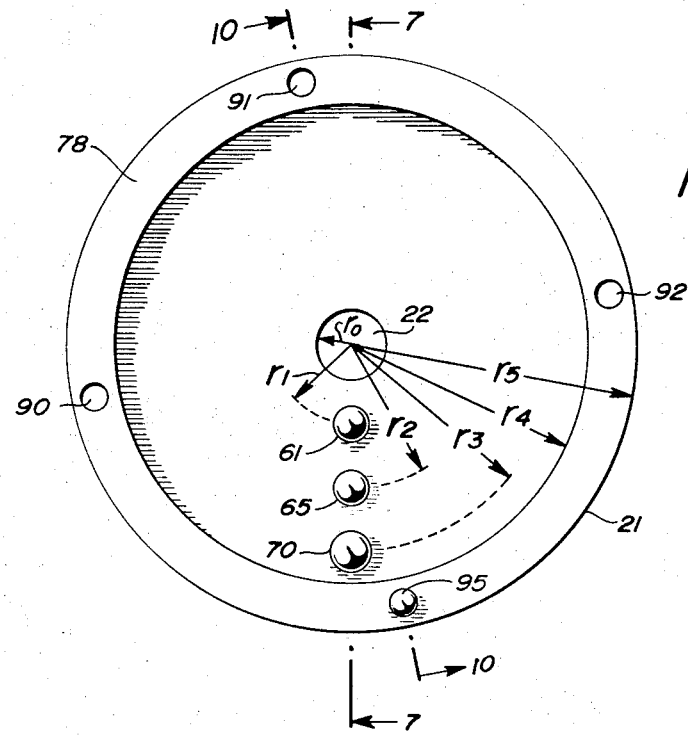
Fig. 6
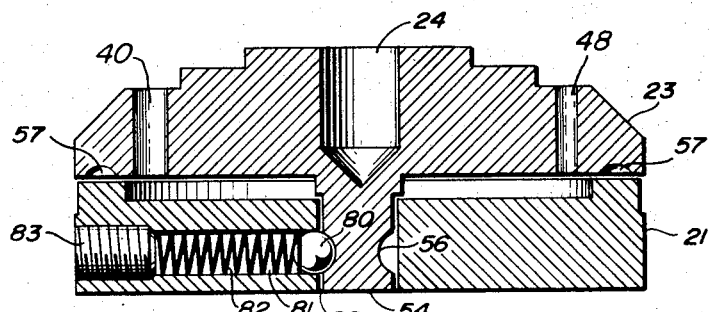
Fig. 9
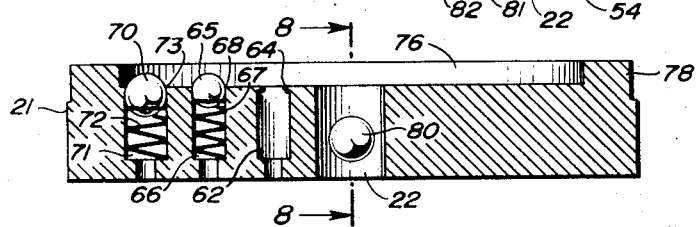
Fig. 7
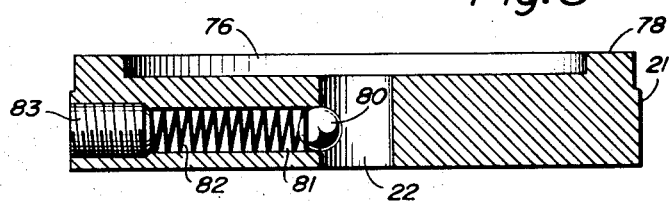
Fig. 8
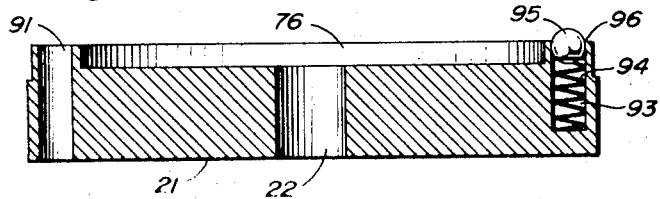
Fig. 10
INVENTOR.
John T. Hoffman
BY
ATTORNEY

DRILL DISPENSING CONTAINER

BACKGROUND OF THE INVENTION

1. Field of the Invention

This invention relates to drill dispensing containers and, in particular, to such containers which positively identify a selected drill. In addition, the invention relates to devices including a shaft, and a base plate having a shaft hole, for permitting rotation of the shaft with respect to the plate while restricting axial motion therebetween. Accordingly, the general objects of this invention are to provide new and improved devices of such character.

The invention is directed to drill dispensing containers of the type adapted to accommodate a plurality of drills of different sizes and which provide for the selection of appropriate drills from the container by means of an indexing device thereon. The primary purpose of the invention is to provide a novel drill container which permits quick selection of a drill of a desired size.

2. Description of the Prior Art

In accordance with a novelty search performed on behalf of the inventor, and directed to a drill holder and base, wherein by rotation an alignment mark is set at indicia raising a desired drill slightly, the following patents of interest were found:

| U.S. Pat. No. | Inventor | Issued Date |
|---|---|---|
| 141,934 | Lamb | August 19, 1873 |
| 2,002,983 | Johnson | May 28, 1935 |
| 2,351,815 | Jensen | June 20, 1944 |
| 2,919,796 | Pressl | January 5, 1960 |
| 2,952,498 | Powers et. al. | September 13, 1960 |
| 3,063,551 | Russell | November 13, 1962 |
| 3,319,780 | Russell | May 16, 1967 |

Foreign Patent
Italy 571,945

The field of search for the foregoing included the following subclasses:
  206-17
  211-69

The Italian patent appears to show a tool which is spring mounted to be pushed through a hole by the spring when the hole in the holding device is properly aligned. The remaining United States patents allow a drill to be dropped out of a hole by turning over the device after aligning holes through an indexing means. None of the foregoing patents, however, are directed to the novel features of applicant's invention.

In accordance with a Separate novelty search performed on behalf of the applicant directed to an axle extending through a hole in a base with the base having holes at right angles to the hole, through which the axle is extended, and these latter holes having ball bearings urged against the circumferential groove in the axle by corresponding springs and set screws, the following patents of interest were found:

| U.S. Pat. No. | Inventor | Issue Date |
|---|---|---|
| 521,987 | Myers | June 26, 1894 |
| 829,658 | Leavitt | Aug. 28, 1906 |
| 1,401,349 | Miquet | Dec. 27, 1921 |
| 1,467,378 | Hanson | Sept. 11, 1923 |
| 1,895,540 | Cohen | Jan. 31, 1933 |
| 1,984,464 | Cohen | Dec. 18, 1934 |
| 2,276,734 | Meredith | March 17, 1942 |
| 2,325,623 | Murtagh et. al. | Aug. 3, 1943 |
| 2,656,227 | Comery | Oct. 20, 1953 |

Leavitt Ser. No. 829,658 and Myers Ser. No. 521,987 both disclose shafts having grooves therein with ball bearings held in the grooves to allow rotation of the shaft. Cohen patents U.S. Pat. Nos. 1,895,540 and 1,984,464 disclose ball bearings held in grooves and shafts by resilient pieces. U.S. Pat. Nos. Miquet 1,401,349, Hanson 1,467,378, Meredith 2,276,734 and Murtagh et al. 2,325,623 disclose ball bearings in grooves and the use of springs to press the ball bearings in the grooves, though not in the novel manner set forth by applicant in his invention. Comery U.S. Pat. No. 2,656,227 is of general interest in regard to the use of ball bearings and a spring with a groove and a shaft. Included in this latter search were the following subclasses:
  308-189, 191,233

SUMMARY OF THE INVENTION

It is an object of this invention to provide a novel drill dispensing container for a set of different size drill bits, which container permits the convenient selection of any desired drill.

Another object of this invention is to provide a novel drill dispensing container for holding different size drills wherein a desired drill can be elevated from its usual position for convenient selection thereof.

Still another object of this invention is to provide a novel holder for drills which holder is durable and efficient in use and which can be simply and easily manufactured.

It is a further object of this invention to provide a novel drill dispensing container utilizing a rotatable drill holder in combination with a circular base with associated indexing means for indicating the desired drill.

Yet another object of this invention is to provide a novel drill dispensing container for holding a plurality of drills in a drill holder which is rotatable about a base, wherein a desired drill having a value indicated by indicia on the drill container is raised slightly to indicate the selected drill.

In accordance with one embodiment of this invention, a drill dispensing container includes a circular base plate, a circular drill holder, and a depending shaft affixed to the central axis of the drill holder for rotary motion within a shaft receiving hole along the central axis of the base plate. Means are provided for restricting the axial motion of the shaft with respect to the base plate. The circular base plate further includes an axially oriented alignment mark on the circumference thereof. The plate further includes three spring-loaded ball bearings disposed at fixed distances from the central axis of the base plate. The base plate has three axial cylindrical pockets, respectively, for receiving three springs and the three ball bearings, the plate further having corresponding lips partly covering the pockets for limiting the extent of travel of the ball bearings. The three ball bearings and the alignment mark are co-aligned along an imaginary radial line from the central axis of the base plate. With a circular base having a radius $r_5$ and the three spring-loaded ball bearings disposed distances $r_1$, $r_2$, and $r_3$, respectively, from the central axis, the base plate is further formed with the concentric recess extending between the distances $r_0$ to $r_4$, wherein $0 \leq r_0 < r_1 < r_2 < r_3 < r_4 < r_5$, so as to form an external concentric rim from $r_4$ to $r_5$, the recess having a sufficient depth so that the extended ball bearings do not extend past the plane of the rim. The circular drill holder has a corresponding radius $r_5$ and further includes a multiplicity of through drill receiving apertures axially disposed within the holder about concentric circles having radii equal to the distances $r_1$, $r_2$, and $r_3$. The apertures are staggered in such a manner that the axes of no two apertures are aligned along a common radius from the axis of the drill holder. The drill holder is provided with external circumferential indicia identifying means for indicating the values of drills to be carried in the drill receiving aperture, each indicium being radially co-aligned with its corresponding aperture. Indexing means are associated with the base plate and the holder for positively co-aligning desired indicia with respect to the alignment mark.

In accordance with certain features of the invention, the indexing means includes a separate spring loaded ball bearing disposed a fixed distance $r_6$ from the central axis on the rim of the base plate, wherein $r_4 < r_6 < r_5$, and wherein the plate has a separate axial cylindrical pocket for receiving a separate spring and the separate ball bearing. The plate has a corresponding lip partially covering the separate cylindrical pocket for limiting the extent of travel of the ball bearing. Also, a plurality of indentations are located on the surface of the holder facing the plate, the indentations being located about a circle on the surface having its center at the center axis of the holder and having a radius of the distance $r_6$. The plurality of indentations is at least equal in number to the total of the through drill-receiving apertures. In accordance with specific features of the invention, the three concentric circles of radii $r_1$, $r_2$, and $r_3$ house four, eight, and 16 apertures, respectively.

In accordance with specific features of the invention, the drill dispensing container has restricting means including a circumferentially disposed groove about the shaft and a spring-biased ball bearing housed within a radial aperture of the base plate which engages with the shaft receiving hole. A set screw within the radial aperture directs the spring biased ball bearing against the groove, thereby permitting rotation of the shaft with respect to the plate while restricting axial motion therebetween.

The immediately preceding feature is especially suitable in cooperation with a drill dispensing container. However, it is advantageous with other mechanisms utilizing shafts. In general, in accordance with a separate embodiment of the invention, a novel combination is set forth including a shaft having a circumferentially disposed groove therein. A base plate, having a hole therewithin for receiving the shaft, has at least one perpendicular aperture which engages the shaft receiving hole. A spring biased ball bearing is housed within the each of the apertures. A set screw within each of the apertures directs the corresponding spring-biased ball bearing against the groove, thereby permitting rotation of the shaft with respect to the plate while restricting axial motion therebetween.

BRIEF DESCRIPTION OF THE DRAWINGS

Other objects, advantages and features of this invention will be more apparent from the following description when read in conjunction with the accompanying drawings, wherein:

FIG. 1 is a perspective view of one embodiment of this invention;

FIG. 2 is a top view thereof;

FIG. 6 is a view taken along the line 6—6 of FIG. 4;

FIG. 7 is a sectional view taken along the line 7—7 of FIG. 6;

FIG. 8 is a sectional view taken along the line 8—8 of FIG. 7;

FIG. 9 is a sectional view taken along the line 9—9 of FIG. 2, and

FIG. 10 is a sectional view taken along the line 10—10 of FIG. 6.

DESCRIPTION OF ONE EMBODIMENT OF THE INVENTION

Figure 3:
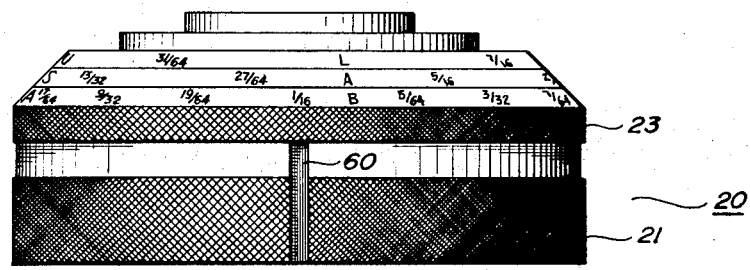
FIG. 3 is a front view thereof.
Figure 4:
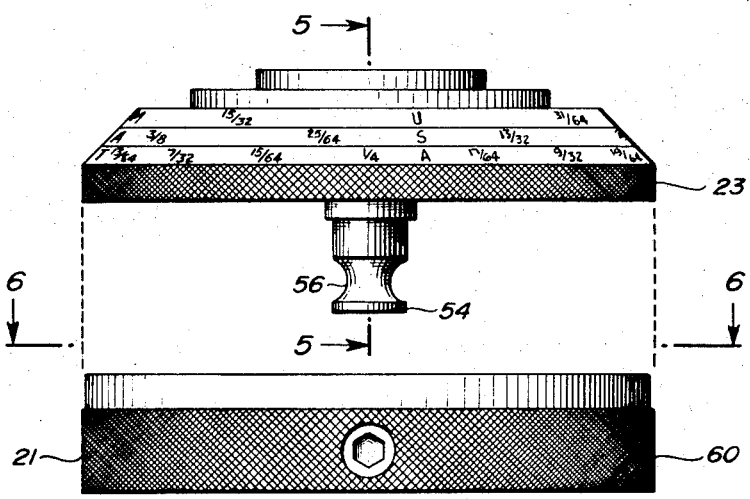
FIG. 4 is an exploded side view thereof.

Referring to the drawings, especially FIGS. 1 and 3, there is shown a drill dispensing container 20. The container 20 includes a lower circular base plate 21 having a shaft receiving hole 22 (FIGS. 6 and 9) along its central axis therewithin. The container 20 further includes a circular drill holder 23 having an overall circumference corresponding to that of the circular base plate 21.

Figure 5:
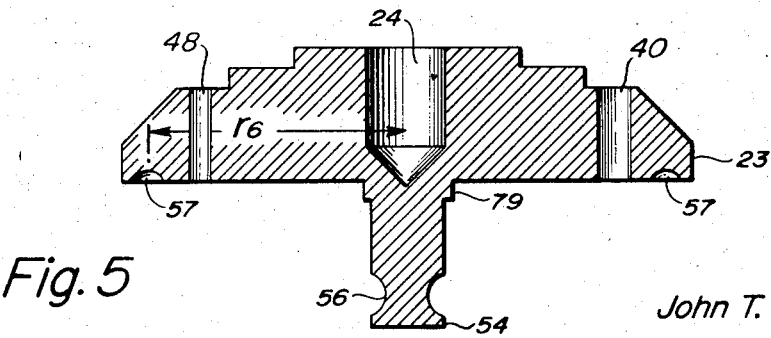
FIG. 5 is a sectional view taken along the line 5—5 of FIG. 4.

Referring in particular to FIG. 2 and 5, the circular drill holder 23 has a central hole 24 extending partially through the thickness thereof from the top down towards the bottom, forming a receptacle for a large drill bit.

Referring again to FIG. 1 but more particularly to FIG. 2, a first plurality of through drill receiving apertures 25, 26, 27, 28 of decreasing diameters are axially disposed within the holder 23 about a circle having its center at the central axis thereof with a radius $r$. A second plurality of through drill receiving apertures 29–36, inclusive, of decreasing diameters are axially disposed within the holder 23 about a concentric circle having a radius $r_2$. A third plurality of through drill receiving apertures 37–52, inclusive, of decreasing diameters are axially disposed within the holder 23 about a concentric circle having a radius $r_3$. Each of the centers of the four apertures located on the circle $r_1$ are disposed equiangularly with respect to each other, that is, displaced at 90° intervals. Similarly, each of the apertures of the second plurality disposed about the circle $r_2$ are disposed equiangularly therein so that the centers thereof are located at angles 45° from an adjacent aperture. In a similar vein, the third plurality of apertures disposed about the circle $r_3$ are equally spaced with their centers 22 ½° from its adjacent aperture. All the apertures located in the three circles are so staggered in such a manner that the axes of no two apertures are aligned along a common radius of the drill holder 23.

In a preferred embodiment, the holes 24–52 are of different dimensions and are in decreasing order of value and, preferably, range from sizes of one-half inch down to one-sixteenth inch in increments of one sixty-fourth inch. For example, aperture 24 is one-half inch, aperture 25 is thirty-one sixty-fourths inch, aperture 26 is fifteen thirty-seconds inch, aperture 51 is five sixty-fourths inch, and aperture 52 is one-sixteenth inch.

Indicia 53–53 are provided circumferentially about a beveled top of the holder 23 for indicating the value of a drill in a given drill receiving aperture 25 to 52, respectively. Each indicium is radically co-aligned with its corresponding aperture, for example, the aperture 39 on the outer circle having the radius $r_3$ is radially co-aligned with the indicium identified as 17/64.

The drill holder 23 is provided with a depending axial shaft 54. The shaft 54, centrally located about the axis of the holder 23, is adapted to fit within the axial shaft receiving hole 22 of the circular base plate 23. The shaft 54 is provided with a circumferentially disposed groove 56 about its periphery.

The drill holder 23 is provided with a plurality of indentations 57—57, (FIG. 5 and 9) on the surface of the holder 23 facing the plate 21. Indentations 57—57 are located about a concentric circle on the surface having a radius $r_6$, the number of indentations 57—57 being at least equal in number to the total number of apertures 25-52. In the embodiment depicted, 32 indentations are provided, one indentation for each spaced indicium depicted in FIG. 1. As shown in FIG. 2, indicia include markings designating the value of the twenty-eight drill receiving apertures 25 – 52, inclusive, and further include four nonusable stops identified as USA, LAB, AND, and MAT disposed at 90 intervals thereof with respect to each other. Hence, there being 32 equiangularly spaced indentations and likewise 32 equiangularly spaced markings, each marking or indentation is spaced from its neighbor by a radial angle 11 ¼°.

Referring now to FIGS. 4 and 6–10, there is shown in greater detail, the circular base plate 21. The circular base plate 21 includes an axially oriented alignment mark 60 on its circumference. A spring-loaded ball bearing 61 is disposed a fixed distance $r_1$ from the central axis of the base plate 21. The plate 21 has a first axial cylindrical pocket 62, as shown in FIG. 7, for receiving a first spring and the first ball bearing 61. The plate 21 further has a first lip 64 partially covering the first cylindrical pocket 62 for limiting the extent of travel of the ball bearing 61. In a similar fashion, a second spring-loaded ball bearing 65 is disposed a fixed distance $r_2$ from the central axis. The plate 21 has a second axial cylindrical pocket 66 for receiving a second spring 67 and the second ball bearing 65. The plate 21 further has a lip 68 partially covering the cylindrical pocket 66 for limiting the extent of travel of the ball bearing 65. A third spring-loaded ball bearing 70 is disposed a fixed distance $r_3$ from the central axis. The plate 21 has an axial cylindrical pocket 71 for receiving a third spring 72 and the third ball bearing 70. The plate 21 further has a third lip 73 partially covering the pocket 71, the pocket 71 limiting the extent of travel of the ball bearing 70. The three ball bearings 61, 65, and 70 and the alignment mark 60 are co-aligned along an imaginary radial line.

For clarity of illustration, one of the ball bearings and its associated spring are intentionally deleted from FIG. 7 so as to provide a clear view of a configuration of the restraining lip associated thesewith.

The circular base plate 21 is further formed with a concentric recess 76 between the dimensions $r_0$ to $r_4$ so that, with a plate having an outer radius $r_5$ and wherein $0 \leq r_0 < r_1 < r_2 < r_3 < r_4 < r_5$, an external rim 78 is concentrically formed having inner and outer radii $r_4$ and $r_5$, respectively. The recess 76 is of sufficient depth so that the extended ball bearings 61, 65, and 70 do not extent past the plane of the rim, as depicted with greater clarity at FIG. 7.

Referring now to FIG. 5, the shaft 54 has a shoulder 79 to provide for mechanical rigidity with the holder 23. The shoulder 79, however, extends downward a depth less than that of the recess 76.

The holder 23 rotates about a central axis with its shaft 54 disposed within the shaft receiving hole 22 of the circular base plate 21. The holder and base plate are maintained in such a manner so that the holder 23 can freely rotate about its axis. Desirably, however, the axial shaft of the holder 23 is restricted in axial movement so that the holder and base plate do not become inadvertantly easily disengaged. Hence, suitable means are provided for restricting the axial motion of the shaft 54 with respect to the base plate 21 while permitting rotation of the shaft 54 within the base plate 21. Such suitable means can include the unique features as described hereinafter.

Referring now to FIGS. 8 and 9, the base plate 21 includes a ball bearing 80 housed within a radial aperture 81 which engages with the shaft receiving hole 22 of the base plate 21. The ball bearing 80 is urged toward the shaft receiving hole 22 by means of a spring 82 which is urged by a set screw 83 housed within the radial aperture. Thus, by adjusting the set screw 83 inwardly, the spring 82 urges the ball bearing 80 toward the shaft receiving hole; the ball bearing 80, engaging within the circumferentially disposed groove 56 of the shaft 54, permits the shaft 54 to rotate within the hole 22 of the base plate 21, but, however, restrains the axial motion of the shaft 54 with respect to the base plate 21. Although in a preferred embodiment for a drill dispensing container, only one radial aperture 81 with an associated spring 82, ball bearing 80, and set screw 83 are shown, additional radial apertures can be used for various axle restraining mechanisms. In situations where heavier loads are used, it is contemplated that three or four equally disposed radial apertures be used for restraining the axial motion of shafts within shaft receiving holes of base plates. With extremely heavy loads, many more than four radially disposed apertures and ball bearings can be used so as to provide for longer life, reduced wear of the various parts, and efficient operation of the mechanism.

The drill dispensing container 20 can be affixed to a table or other support through the means of suitable bolts which can engage within holes 90, 91, and 92 (FIGS. 6 and 10). A partial hole 93 provides a pocket for receiving a spring 94 which is urged against a ball bearing 95. The ball bearing 95 is restrained by a lip 96 in the rim 78 of the base plate 21.

In operation, as the holder 23 is rotated with respect to the base plate 21, so that a desired indicium is aligned with the alignment mark 60, an appropriate one of the ball bearings 61, 65, 70 raises the selected drill from its usual elevation, slightly, so as to indicate the selected drill for easy removal from the drill dispensing container 20.

The ball bearing 95 together with the associated indentations 57—57 form an indexing means associated with the base plate and the holder for positively co-aligning the desired indicia with respect to the alignment mark.

Various features of this invention can be used either separately or together. For example, the drill dispensing container can function with axle restraining means of a type other than that described, and the axle restraining means described can be used with apparatus other than drill dispensing containers. Preferably, both are used in cooperation as described herein because of its simplicity and because the depth of the shaft can be limited in length to obviate the requirement for a nut or nuts at its base, which nut or nuts would otherwise further extend beyond the bottom surface of the plate.

The external edges of the base plate and the drill holder can be knurled so as to provide for convenient rotation of the two with respect to each other. Such knurling is a desirable feature; however, it is not essential to this invention nor to an understanding thereof.

Various parts are depicted in the drawing as being constructed of metal. However, it is understood that other materials can be used, such as plastic for example, which may be more desirable in terms of ease of manufacture and of cost.

Other configurations are, of course, well within the skill of the art. It may be desirable to utilize more than three concentric circles for housing drill bits in situations such as drill containers to house drills ranging from one-sixteenth inch up to 1 inch, for example.

What is claimed is:

1. A drill dispensing container comprising
   a. a circular base plate having a radius $r_5$ having a shaft receiving hole of radius $r_0$ extending along the central axis therewithin, and further having
      1. an axially oriented alignment mark on the circumferential surface of said base plate;
      2. a first spring-loaded ball bearing disposed a fixed distance $r_1$ from said central axis, said base plate having a first axial cylindrical pocket for receiving a first spring and said first ball bearing, said base plate further having a first lip partially covering the entrance to said first cylindrical pocket for limiting the extent of travel of said first ball bearing;
      3. a second spring-loaded ball bearing disposed a fixed distance $r_2$ from said central axis, said base plate having a second axial cylindrical pocket for receiving a second spring and said second ball bearing, said base plate further having a second lip partially covering the entrance to said second cylindrical pocket for limiting the extent of travel of said second ball bearing;
      4. a third spring-loaded ball bearing disposed a fixed distance $r_3$ from said central axis, said base plate having a third axial cylindrical pocket for receiving a third spring and said third ball bearing, said base plate further having a third lip partially covering the entrance to said third cylindrical pocket for limiting the extent of travel of said third ball bearing; said first ball bearing, said second ball bearing, said third ball bearing, and said alignment mark being co-aligned along an imaginary radial line from said central axis; and wherein said base plate is
      5. formed with a concentric recess extending between the distances $r_0$ to $r_4$, wherein $0 \leq r_0 < r_1 < r_2 < r_3 < r_4 < r_5$, so as to form an external concentric rim from $r_4$ to $r_5$, said recess having a sufficient depth so that the ball bearings which extend above the top surface of the recess do not extend past the upper plane of said rim;
   b. a circular drill holder having said radius $r_5$ and having
      1. a first plurality of through drill receiving apertures, axially disposed within said holder, oriented in a circle having a radius $r_1$ and being concentric with respect to the central axis of said drill holder,
      2. a second plurality of through drill receiving apertures, axially disposed within said holder, oriented in a circle having a radius $r_2$ and being concentric with respect to the central axis of said drill holder, and
      3. a third plurality of through drill receiving apertures, axially disposed within said holder, oriented in a circle having a radius $r_3$ and being concentric with respect to the central axis of said drill holder, the apertures in each concentric circle being staggered relative to the apertures in all the other concentric circles in such a manner that the axes of no two apertures are aligned along a common radius of said drill holder;
      4. external circumferential indicia indentifying means for indicating the sizes of the drills to be carried in said drill receiving apertures, each indicium being radially co-aligned with its corresponding aperture;
   c. a depending shaft affixed in alignment with the central axis of said drill holder for rotary motion within said shaft receiving hole;
   d. means for restricting axial motion of said shaft with respect to said base plate; and
   e. indexing means associated with said base plate and said holder for positively co-aligning desired indicia identifying means with respect to said alignment mark.

2. The drill dispensing container as recited in claim 1 wherein said indexing means (e) includes
   i. a fourth spring loaded ball bearing disposed, on said rim, a fixed distance $r_6$ from said central axis, wherein $r_4 < r_6 < r_5$, and wherein said plate has a fourth axial cylindrical pocket for receiving a fourth spring and said fourth ball bearing, and said plate further having a fourth lip partially covering said fourth cylindrical pocket for limiting the extent of travel of said fourth ball bearing; and
   ii. a plurality of indentations on the surface of said holder facing said plate, said indentations being located about a circle on said surface having its center at the center axis of said holder and having a radius of said distance $r_6$, said plurality of indentations being at least equal in number to the total of said pluralities of apertures.

3. The drill dispensing container as recited in claim 1 wherein said first plurality of apertures is four, said second plurality of apertures is eight, and said third plurality of apertures is sixteen.

4. The drill dispensing container as recited in claim 1 wherein said restricting means (d) includes
   i. a circumferentially disposed groove about said shaft;
   ii. a spring biased ball bearing housed within a radial aperture engaging with said shaft receiving hole; and iii. a set screw within said radial aperture for directing said spring biased ball bearing against said groove, thereby permitting rotation of said shaft with respect to said plate while restricting axial motion therebetween.

* * * * *